United States Patent
Liu et al.

(10) Patent No.: US 11,753,494 B2
(45) Date of Patent: Sep. 12, 2023

(54) LIQUID-STATE REACTIVE POLYURETHANE ADHESIVE

(71) Applicants: EVERMORE CHEMICAL INDUSTRY CO., LTD., Nantou (TW); Pou Chien Chemical Co., Ltd., Dong Guan (CN)

(72) Inventors: Shih-Wei Liu, Nantou (TW); Pin-Jung Chen, Nantou (TW); Kuo-Kai Liao, Nantou (TW)

(73) Assignees: EVERMORE CHEMICAL INDUSTRY CO., LTD., Nantou (TW); POU CHIEN CHEMICAL CO., LTD., Dong Guan (CN)

( * ) Notice: Subject to any disclaimer, the term of this patent is extended or adjusted under 35 U.S.C. 154(b) by 95 days.

(21) Appl. No.: 17/326,873

(22) Filed: May 21, 2021

(65) Prior Publication Data
US 2021/0388147 A1    Dec. 16, 2021

(30) Foreign Application Priority Data
Jun. 11, 2020 (TW) ................. 109119723

(51) Int. Cl.
| | |
|---|---|
| C08G 18/20 | (2006.01) |
| C09J 11/04 | (2006.01) |
| C08G 18/10 | (2006.01) |
| C09J 175/08 | (2006.01) |
| C08G 18/48 | (2006.01) |
| C09J 9/00 | (2006.01) |
| C08G 18/44 | (2006.01) |

(52) U.S. Cl.
CPC ......... C08G 18/10 (2013.01); C08G 18/2081 (2013.01); C08G 18/44 (2013.01); C08G 18/4829 (2013.01); C09J 9/00 (2013.01); C09J 11/04 (2013.01); C09J 175/08 (2013.01)

(58) Field of Classification Search
CPC .......... C08G 18/10; C08G 18/2081; C08G 18/4829; C08G 18/44; C09J 175/08; C09J 9/00; C09J 11/04
See application file for complete search history.

(56) References Cited

U.S. PATENT DOCUMENTS

| | | | | |
|---|---|---|---|---|
| 4,267,044 A | * | 5/1981 | Kroplinski | C08G 18/10 |
| | | | | 210/493.5 |
| 6,015,475 A | * | 1/2000 | Hsieh | C08G 18/73 |
| | | | | 528/53 |
| 2018/0334600 A1 | * | 11/2018 | Schlumpf | C04B 41/4884 |

FOREIGN PATENT DOCUMENTS

| | | |
|---|---|---|
| CN | 1266080 A | 9/2000 |
| CN | 1871185 A | 11/2006 |
| CN | 102532463 A | 7/2012 |
| CN | 107849212 A | 3/2018 |
| CN | 108368231 A | 8/2018 |
| CN | 110551474 A | 12/2019 |
| JP | 2007161991 A | 6/2007 |
| WO | WO-2012158664 A2 * | 11/2012 ............ B32B 9/00 |

* cited by examiner

*Primary Examiner* — Michael L Leonard
(74) *Attorney, Agent, or Firm* — MCBEE MOORE & VANIK IP, LLC; Susan McBee

(57) ABSTRACT

The present disclosure provides a liquid-state reactive polyurethane adhesive, which includes a polyurethane prepolymer. The polyurethane prepolymer is blocked by an isocyanate group, and the polyurethane prepolymer is obtained by a polymerization reaction, a reactive monomer of the polymerization reaction includes a polyisocyanate, a polyol, a stabilizer, a catalyst and a hydrophobic filler. A functionality of the polyisocyanate is 2.4 to 3. A molecular weight of the polyol is 1000 to 8000, and the polyol has hydrolysis resistance. The stabilizer has a structure represented by formula (I). The catalyst has a structure represented by formula (II). Formula (I) and formula (II) are as defined in the specification.

10 Claims, No Drawings

LIQUID-STATE REACTIVE POLYURETHANE ADHESIVE

RELATED APPLICATIONS

This application claims priority to Taiwan Application Serial Number 109119723, filed Jun. 11, 2020, which is herein incorporated by reference.

BACKGROUND

Technical Field

The present disclosure relates to a liquid-state reactive polyurethane adhesive. More particularly, the present disclosure relates to a liquid-state reactive polyurethane adhesive used for the structural woodworking.

Description of Related Art

The conventional glued-laminated timber is that the fiber directions (wood direction) of the saw lumber and the small angle timber are parallel to each other, and glued-laminate at the thickness, width and length directions. Furthermore, the saw lumber or the small angle timber that made up the glued-laminated timber is called lamina. However, the manufacturing process of the glued-laminated timber is mainly that the logs made into the saw lumber (lamina) and then dried, the lamina is fixed size (fixed width, fixed thickness), the longitudinal or wide splicing of the lamina, the classification of the lamina, the adhesive-coated, the glued-laminated, and the shipment, etc. The type of the adhesive can be selected according to its use environment.

The traditional industry mainly uses phenol/resorcinol/formaldehyde resin (PRF) and melamine/urea/formaldehyde resin (MUF) as the adhesive for the glued-laminated timber. However, the raw materials of the adhesive contain formaldehyde, and formaldehyde is toxic and non-environmentally friendly adhesive. Furthermore, other general adhesives, such as PVAc white glue, hot melt adhesive etc., cannot satisfy the stringent structural safety standards.

In summary, the industry is still looking for an adhesive that has good bonding strength and a non-toxic property, can satisfy various building safety standards and tests, and become a new environmentally friendly building material.

SUMMARY

According to one aspect of the present disclosure, a liquid-state reactive polyurethane adhesive is provided. The liquid-state reactive polyurethane adhesive includes a polyurethane prepolymer. The polyurethane prepolymer is blocked by an isocyanate group, and the polyurethane prepolymer is obtained by a polymerization reaction, a reactive monomer of the polymerization reaction includes a polyisocyanate, a polyol, a stabilizer, a catalyst and a hydrophobic filler. A functionality of the polyisocyanate is 2.4 to 3. A molecular weight of the polyol is 1000 to 8000, and the polyol has hydrolysis resistance. The stabilizer has a structure represented by formula (I):

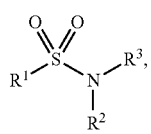

formula (I)

wherein $R^1$, $R^2$ and $R^3$ are each independently a hydrogen or a monovalent organic group. The catalyst has a structure represented by formula (II):

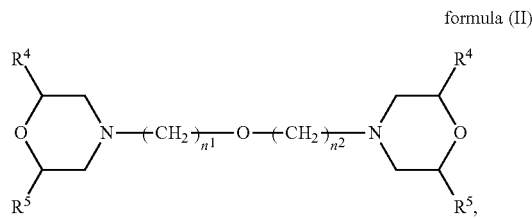

formula (II)

wherein $R^4$ and $R^5$ are each independently a hydrogen or a alkyl group, $n^1$ and $n^2$ are each independently an integer from 2 to 4.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

In the present disclosure, the range represented by "a numerical value to another numerical value" is a summary expression method to avoid listing all the values in the range one by one in the specification. Therefore, the record of a specific numerical range covers any numerical value within the numerical range and a smaller numerical range defined by any numerical value within the numerical range, as the any numerical range and the smaller numerical range described in the specification. For example, the range of "0.1 wt % to 1 wt %", regardless of whether other values are listed in the specification, encompasses the range of "0.5 wt % to 0.8 wt %".

Liquid-State Reactive Polyurethane Adhesive

A liquid-state reactive polyurethane adhesive is provided of the present disclosure, which includes a polyurethane prepolymer. The polyurethane prepolymer is blocked by an isocyanate group, and the polyurethane prepolymer is obtained by a polymerization reaction. A reactive monomer of the polymerization reaction includes a polyisocyanate, a polyol, a stabilizer, a catalyst and a hydrophobic filler. Based on a total weight of the reactive monomer is 100 parts by weight, a content of the polyisocyanate is 40 parts to 70 parts by weight, a content of the polyol is 30 parts to 60 parts by weight, a content of the stabilizer is 0.01 parts to 3 parts by weight, a content of the catalyst is 0.01 parts to 3 parts by weight, and a content of the hydrophobic filler is 0.5 parts to 5 parts by weight. Furthermore, the reactive monomer of the polyurethane prepolymer of the present disclosure can further include a polyamine, and based on the total weight of the reactive monomer is 100 parts by weight, a total content of the polyol and the polyamine is 30 parts to 60 parts by weight.

In the reactive monomer of the polyurethane prepolymer, a functionality of the polyisocyanate is 2.4 to 3. The polyisocyanate is selected from an aromatic polyisocyanate, an aliphatic polyisocyanate, an alicyclic polyisocyanate or a mixture thereof. For example, the polyisocyanate can be but not limited to one of hexamethylene diisocyanate trimer (HDI Trimer), hexamethylene diisocyanate biuret (HDI Biuret), polyaryl polymethylene isocyanate (PAPI) or a mixture of more than one.

The reactive monomer of the polyurethane prepolymer can only include the polyol, or include the polyol and the polyamine, wherein a molecular weight of the polyol and the polyamine is 1000 to 8000, and both have hydrolysis resistance. The polyol is selected from a polycarbonate polyol, a polyether polyol or a mixture thereof. For example, the polyol can be but not limited to one of polyoxypropylene polyol, polyoxyethylene polyol, polyoxypropylene-oxyethylene copolymer polyol, polytetrahydrofuran polyol, polycarbonate-polyoxypropylene polyol or a mixture of more than one. Furthermore, the polyamine can be but not limited to one of polyoxypropylene polyamine, polyoxyethylene polyamine, polyoxypropylene-oxyethylene copolymer polyamine or a mixture of more than one.

In the reactive monomer of the polyurethane prepolymer, the stabilizer has a structure represented by formula (I):

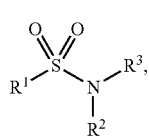

formula (I)

wherein $R^1$, $R^2$ and $R^3$ are each independently a hydrogen or a monovalent organic group. The aforementioned monovalent organic group can be a hydroxyl group, a cyano group, a nitro group, a substituted or an unsubstituted amino group, an amide group, a hydrazine group, a hydrazone group, a substituted or an unsubstituted alkyl group of 1 to 60 carbon atoms, a substituted or an unsubstituted alkenyl group of 2 to 60 carbon atoms, a substituted or an unsubstituted alkynyl group of 2 to 60 carbon atoms, a substituted or an unsubstituted alkoxy group of 1 to 60 carbon atoms, a substituted or an unsubstituted cycloalkyl group of 3 to 10 carbon atoms, a substituted or an unsubstituted cycloalkenyl group of 3 to 10 carbon atoms, a substituted or an unsubstituted heterocycloalkyl group of 3 to 10 carbon atoms, a substituted or an unsubstituted heterocycloalkenyl group of 3 to 10 atoms, a substituted or an unsubstituted aryl group of 6 to 30 carbon atoms, a substituted or an unsubstituted aryloxy group of 6 to 30 carbon atoms, a substituted or an unsubstituted arylthio group of 6 to 30 carbon atoms, a substituted or an unsubstituted heteroaryl group of 2 to 30 carbon atoms, a substituted or an unsubstituted aldehyde group or a substituted or an unsubstituted silyl group. The aforementioned "substituted" means that at least one hydrogen atom can be substituted by the deuterium atom, the halogen atom or the monovalent organic group (hereinafter, the deuterium atom, the halogen atom or the monovalent organic group which substitutes the hydrogen atom is referred as a substituted group). The monovalent organic group is as described in the above paragraph. Furthermore, when at least two hydrogen atoms are substituted, the kinds of the substituted group can be the same or different. The common substituted group includes but not limited to the alkyl group of 1 to 60 carbon atoms, the aryl group of 6 to 30 carbon atoms or the heteroaryl group of 2 to 30 carbon atoms.

In the reactive monomer of the polyurethane prepolymer, the catalyst has a structure represented by formula (II):

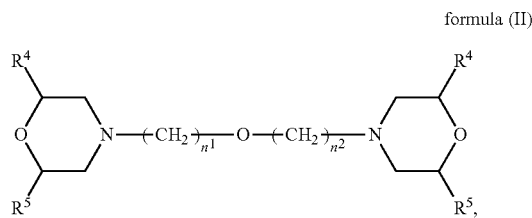

formula (II)

wherein $R^4$ and $R^5$ are each independently a hydrogen or an alkyl group, $n^1$ and $n^2$ are each independently an integer from 2 to 4. For example, the catalyst of the formula (II) can be but not limited to a catalyst having a structure represented in any one of formula (II-1) and formula (II-2). The catalyst of the formula (II-1) is 2,2-dimorpholinodiethylether, and the catalyst of the formula (II-2) is bis[2-(2,6-dimethylmorpholinyl)ethyl)ether].

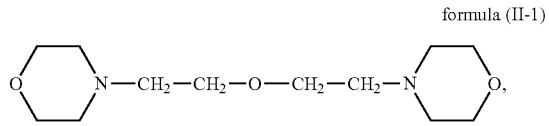

formula (II-1)

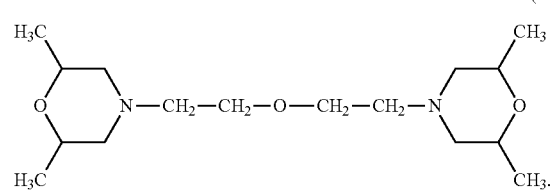

formula (II-2)

In the reactive monomer of the polyurethane prepolymer, the hydrophobic filler is selected from a hydrophobic calcium carbonate, a hydrophobic silica, a hydrophobic talcum powder, a hydrophobic clay or a mixture thereof. Furthermore, the reactive monomer of the polyurethane prepolymer can further include an additive, and the additive can be an antioxidant.

Example and Comparative Example

The polyisocyanate and its isocyanate group content used in Example/Comparative Example are shown in Table 1. In Table 1, the polyisocyanate (Iso-1) is a low-viscosity solvent-free aliphatic polyisocyanate trimer (Desmodur® N3600), which is purchased from Covestro. The polyisocyanate (Iso-2) is a low-viscosity solvent-free aliphatic polyisocyanate trimer (DURANATE™ TPA-100), which is purchased from AsahiKASEI. The polyisocyanate (Iso-3) is methylene diphenyl diisocyanate (MILLIONATE NM), which is purchased from TOSOH.

TABLE 1

| polyisocyanate | isocyanate group content |
| --- | --- |
| (Iso-1) | NCO = 23.0% |
| (Iso-2) | NCO = 23.1% |
| (Iso-3) | NCO = 33.5% |

The polyol/polyamine and its hydroxyl value/amine value and molecular weight used in Example/Comparative Example are shown in Table 2. In Table 2, the polyol (Poly-1) is polycarbonate-polyether copolymer diols (Converge® CPX-2520-56), which is purchased from aramco. The polyol (Poly-2) is polycarbonate diols (DURANOL™ T5652), which is purchased from AsahiKASEI. The polyol (Poly-3) is a low monofunctionality high activity polyether glycol (Acclaim® 4220N), which is purchased from Covestro. The polyol (Poly-4) is a low monofunctionality polyether copolymer diols (VARANOL 1000LM), which is purchased from DOW. The polyamine (Poly-5) is polyoxypropylene diamine (JEFFAMINE® D-4000), which is purchased from Huntsman. The polyol (Poly-6) is poly-1,4-butylene adipate glycol (P-2420), which is purchased from EVERMORE CHEMICAL INDUSTRY. The polyol (Poly-7) is polyethylene adipate glycol-1,4-butanediol ester diol (P-2720), which is purchased from EVERMORE CHEMICAL INDUSTRY.

TABLE 2

| polyol/polyamine | hydroxyl value/amine value (mg KOH/g) | molecular weight |
|---|---|---|
| (Poly-1) | OHv = 56 | 2000 |
| (Poly-2) | OHv = 56 | 2000 |
| (Poly-3) | OHv = 28 | 4000 |
| (Poly-4) | OHv = 112 | 1000 |
| (Poly-5) | Av = 28 | 4000 |
| (Poly-6) | OHv = 56 | 2000 |
| (Poly-7) | OHv = 56 | 2000 |

The stabilizer and its structure formula used in Example/Comparative Example are shown in Table 3. In Table 3, the stabilizer (Add-1) is N-ethyl-p-toluenesulfonamide. The stabilizer (Add-2) is N-(2-hydroxypropyl)benzenesulfonamide. The stabilizer (Add-3) is N-butylbenzenesulfonamide. The above stabilizers are purchased from Merck KGaA.

TABLE 3

| stabilizer | structure formula |
|---|---|
| (Add-1) | [structure of N-ethyl-p-toluenesulfonamide] |
| (Add-2) | [structure of N-(2-hydroxypropyl)benzenesulfonamide] |
| (Add-3) | [structure of N-butylbenzenesulfonamide] |

The hydrophobic filler (Add-4) used in Example/Comparative Example is a fatty acid surface-treated light calcium carbonate (Hakuenka® CCR-S), which is purchased from Shiraishi-Omya GmbH. The hydrophobic filler (Add-5) used in Example/Comparative Example is a hydrophobic silica (AEROSIL® R972), which is purchased from EVONIK.

The catalyst (Add-6) used in Example/Comparative Example is 2,2-dimorpholinodiethylether (JEFFCAT® DMDEE), which is purchased from Huntsman.

The additive (Add-7) used in Example/Comparative Example is pentaerythritol tetrakis(3,5-di-tert-butyl-4-hydroxyphenyl)propionate (Irganox® 1010), which is purchased from BASF.

A Manufacturing Method for a Liquid-State Reactive Polyurethane Adhesive

The liquid-state reactive polyurethane adhesives of Example 1 to Example 4 of the present disclosure are prepared in accordance with the composition and weight ratio shown in Table 4. First, loading the polyol/polyamine, the stabilizer, the hydrophobic filler, the catalyst and the additive into the reactor according to the content in Table 4, heating to 115° C. to 120° C. and dehydrating in vacuum for 1.5 hours, then cooling to 55° C. to 60° C. Next, adding the polyisocyanate according to the content in Table 4, heating to 80° C. to 85° C. and reacting for 2 hours, then testing the value of NCO %. After compliance, the temperature is cooled to 55° C. to 60° C. for packaging, and the obtained polyurethane prepolymer is the liquid-state reactive polyurethane adhesive.

TABLE 4

| composition | | Example 1 | Example 2 | Example 3 | Example 4 |
|---|---|---|---|---|---|
| polyisocyanate | (Iso-1) | 60 | 0 | 30 | 30 |
| | (Iso-2) | 0 | 60 | 30 | 30 |
| | (Iso-3) | 0 | 0 | 0 | 0 |
| polyol/polyamine | (Poly-1) | 10 | 10 | 10 | 10 |
| | (Poly-2) | 5 | 5 | 5 | 5 |
| | (Poly-3) | 20 | 20 | 20 | 15 |
| | (Poly-4) | 5 | 5 | 5 | 5 |
| | (Poly-5) | 0 | 0 | 0 | 5 |
| | (Poly-6) | 0 | 0 | 0 | 0 |
| | (Poly-7) | 0 | 0 | 0 | 0 |
| stabilizer | (Add-1) | 1 | 0 | 0 | 0 |
| | (Add-2) | 0 | 1 | 0 | 0 |
| | (Add-3) | 0 | 0 | 1 | 1 |
| hydrophobic filler | (Add-4) | 0.5 | 0.5 | 0.5 | 0.5 |
| | (Add-5) | 1.5 | 1.5 | 1.5 | 1.5 |
| catalyst | (Add-6) | 1 | 1 | 1 | 1 |
| additive | (Add-7) | 0.5 | 0.5 | 0.5 | 0.5 |

The liquid-state reactive polyurethane adhesives of Comparative Example 1 to Comparative Example 6 of the present disclosure are prepared in accordance with the composition and weight ratio shown in Table 5. The other steps are the same as Example 1 to Example 4.

TABLE 5

| composition | | content (unit: wt %) | | |
|---|---|---|---|---|
| | | Comparative Example 1 | Comparative Example 2 | Comparative Example 3 |
| polyisocyanate | (Iso-1) | 0 | 60 | 60 |
| | (Iso-2) | 0 | 0 | 0 |
| | (Iso-3) | 60 | 0 | 0 |
| polyol/polyamine | (Poly-1) | 10 | 0 | 0 |
| | (Poly-2) | 5 | 0 | 0 |
| | (Poly-3) | 20 | 0 | 0 |
| | (Poly-4) | 5 | 0 | 0 |

TABLE 5-continued

| composition | | content (unit: wt %) | | |
|---|---|---|---|---|
| | (Poly-5) | 0 | 0 | 0 |
| | (Poly-6) | 0 | 40 | 0 |
| | (Poly-7) | 0 | 0 | 40 |
| stabilizer | (Add-1) | 1 | 1 | 1 |
| | (Add-2) | 0 | 0 | 0 |
| | (Add-3) | 0 | 0 | 0 |
| hydrophobic | (Add-4) | 0.5 | 0.5 | 0.5 |
| filler | (Add-5) | 1.5 | 1.5 | 1.5 |
| catalyst | (Add-6) | 1 | 1 | 1 |
| additive | (Add-7) | 0.5 | 0.5 | 0.5 |

| | | Comparative Example 4 | Comparative Example 5 | Comparative Example 6 |
|---|---|---|---|---|
| polyisocyanate | (Iso-1) | 60 | 60 | 60 |
| | (Iso-2) | 0 | 0 | 0 |
| | (Iso-3) | 0 | 0 | 0 |
| polyol/ | (Poly-1) | 10 | 10 | 10 |
| polyamine | (Poly-2) | 5 | 5 | 5 |
| | (Poly-3) | 20 | 20 | 20 |
| | (Poly-4) | 5 | 5 | 5 |
| | (Poly-5) | 0 | 0 | 0 |
| | (Poly-6) | 0 | 0 | 0 |
| | (Poly-7) | 0 | 0 | 0 |
| stabilizer | (Add-1) | 0 | 1 | 1 |
| | (Add-2) | 0 | 0 | 0 |
| | (Add-3) | 0 | 0 | 0 |
| hydrophobic | (Add-4) | 0.5 | 0 | 0.5 |
| filler | (Add-5) | 1.5 | 0 | 1.5 |
| catalyst | (Add-6) | 1 | 1 | 0 |
| additive | (Add-7) | 0.5 | 0.5 | 0.5 |

Evaluation Measurement Method

Measurement of viscosity: after the prepared liquid-state reactive polyurethane adhesive is kept at a constant temperature of 25° C. in an oven, the viscosity value is measured by Brookfield viscometer according to the ASTM2196 standard method.

Measurement of isocyanate group content (NCO %): dissolving dibutylamine in dimethylformamide and reacting with the isocyanate group (—NCO) in the liquid-state reactive polyurethane adhesive. The excess dibutylamine is titrated by hydrochloric acid standard solution and the isocyanate group content in the sample is measured, the unit is wt %.

Measurement of molar ratio of the isocyanate group and the hydroxyl group of the polyol (NCO/OH): detecting the OH value of each polyol by the acid-base titration, and calculating the molar number of OH according to the formula. The aforementioned isocyanate group content is converted into the molar number, and dividing the molar number of the isocyanate group by the molar number of OH, the molar ratio of the isocyanate group and the hydroxyl group of the polyol can be obtained.

Glue failure rate of water immersion test: after bonding the liquid-state reactive polyurethane adhesive to the structural woodworking, immersing in the room temperature water (10° C. to 25° C.) for 24 hours first, and then drying (70° C.) for 24 hours.

Glue failure rate of boiling water test: after bonding the liquid-state reactive polyurethane adhesive to the structural woodworking, immersing in the boiling water (100° C.) for 4 hours first, and immersing in the room temperature water (10° C. to 25° C.) for 1 hour, then drying (70° C.) for 24 hours.

Glue failure rate of pressurization and decompression test: after bonding the liquid-state reactive polyurethane adhesive to the structural woodworking, immersing in the room temperature water (10° C. to 25° C.) and the pressure is 0.085 MPa for 5 minutes, and changing the pressure to 0.51 MPa for 1 hour, then drying (70° C.) for 24 hours after the second cycle.

Operating time: the time from the start of gluing to the final full pressurization.

Pressurization time: the time from the start of pressurization to the release of pressure.

Viscosity stability: placing at an ambient temperature of 70° C. for 5 days, and the viscosity value is measured by Brookfield viscometer.

When the liquid-state reactive polyurethane adhesive of the present disclosure is performed the bonding test with the structural woodworking in the different environment, the glue failure rate should be less than 5%, the operating time should be less than 10 minutes, the pressurization time should be less than 25 minutes, and the viscosity stability of the liquid-state reactive polyurethane adhesive should be less than 35000 cps to satisfy the standard. Furthermore, the substrate of the structural woodworking can be cypress, rosewood, fir or radiation wood.

The liquid-state reactive polyurethane adhesive of Example 1 to Example 4 is performed the aforementioned evaluation measurement methods, and the results are recorded in Table 6.

TABLE 6

| | Example 1 | Example 2 |
|---|---|---|
| Characteristic | | |
| Viscosity (cps) @ 25° C. | 30200 | 29800 |
| NCO/OH | 9.4 | 9.4 |
| NCO (%) | 11.80 | 11.86 |
| Processing condition | | |
| Glue failure rate of water immersion test (%) | 0 | 0 |
| Glue failure rate of boiling water test (%) | 2.3 | 1.9 |
| Glue failure rate of pressurization and decompression test (%) | 0.9 | 1.1 |
| Operating time (min) | 4 | 4 |
| Pressurization time (min) | 10 | 10 |
| Viscosity stability (cps) | 32918 | 32184 |
| Evaluation | qualified | qualified |

| | Example 3 | Example 4 |
|---|---|---|
| Characteristic | | |
| Viscosity (cps) @ 25° C. | 30100 | 31794 |
| NCO/OH | 9.4 | 9.4 |
| NCO (%) | 11.83 | 11.83 |
| Processing condition | | |
| Glue failure rate of water immersion test (%) | 0 | 0 |
| Glue failure rate of boiling water test (%) | 2.0 | 1.3 |
| Glue failure rate of pressurization and decompression test (%) | 1.3 | 0.7 |
| Operating time (min) | 4 | 4 |
| Pressurization time (min) | 10 | 10 |
| Viscosity stability (cps) | 32508 | 34175 |
| Evaluation | qualified | qualified |

The liquid-state reactive polyurethane adhesive of Comparative Example 1 to Comparative Example 6 is performed the aforementioned evaluation measurement methods, and the results are recorded in Table 7.

TABLE 7

| Characteristic | Comparative Example 1 | Comparative Example 2 | Comparative Example 3 |
|---|---|---|---|
| Viscosity (cps) @ 25° C. | 10300 | solid | 120500 |
| NCO/OH | 13.7 | 8.2 | 8.2 |
| NCO (%) | 17.83 | 11.60 | 11.60 |
| Processing condition | | | |
| Glue failure rate of water immersion test (%) | 23.7 | N/A | 43.7 |
| Glue failure rate of boiling water test (%) | 33.5 | N/A | 47.5 |
| Glue failure rate of pressurization and decompression test (%) | 12.7 | N/A | 60.7 |
| Operating time (min) | 5 | N/A | 2 |
| Pressurization time (min) | 12.5 | N/A | 5 |
| Viscosity stability (cps) | 10815 | N/A | 150000 |
| Evaluation | unqualified | N/A | unqualified |

| Characteristic | Comparative Example 4 | Comparative Example 5 | Comparative Example 6 |
|---|---|---|---|
| Viscosity (cps) @ 25° C. | 32800 | 8900 | 30200 |
| NCO/OH | 9.4 | 9.4 | 9.4 |
| NCO (%) | 11.91 | 12.03 | 11.91 |
| Processing condition | | | |
| Glue failure rate of water immersion test (%) | 0 | 3 | N/A |
| Glue failure rate of boiling water test (%) | 2.7 | 23.9 | N/A |
| Glue failure rate of pressurization and decompression test (%) | 1.5 | 31.8 | N/A |
| Operating time (min) | 3 | 5 | 70 |
| Pressurization time (min) | 7.5 | 12.5 | 175 |
| Viscosity stability (cps) | 46904 | 9434 | 31106 |
| Evaluation | unqualified | unqualified | N/A |

According to the results of Table 4 to Table 7, the analyze of the difference between Example 1 to Example 4 and Comparative Example 1 to Comparative Example 6 as follows.

The functionality of the polyisocyanate of Comparative Example 1 is 2, so that the polyisocyanate used in Comparative Example 1 is not the polyisocyanate used in the present disclosure. When Comparative Example 1 is performed the bonding test with the structural woodworking, the glue failure rate is far greater than 5% under the environment of water immersion, boiling water, pressurization and decompression due to the insufficient crosslinking of the adhesive, so that Comparative Example 1 cannot be used for the structural woodwork bonding.

The polyols of Comparative Example 2 and Comparative Example 3 are polyester polyols, which do not have hydrolysis resistance, and hydrolysis is easy to cause the physical properties become lower. The crystallinity of the polyol in the liquid-state reactive polyurethane adhesive of Comparative Example 2 is too high, so that the prepolymer of Comparative Example 2 is solid at the room temperature and does not have viscosity, thus Comparative Example 2 cannot be used for the structural woodwork bonding. However, the crystallinity of the polyol in the liquid-state reactive polyurethane adhesive of Comparative Example 3 is low, so that the prepolymer of Comparative Example 3 can still flow at the room temperature, but when Comparative Example 3 is performed the bonding test with the structural woodworking, the glue failure rate is far greater than 5% under the environment of water immersion, boiling water, pressurization and decompression, so that Comparative Example 3 cannot be used for the structural woodwork bonding.

The stabilizer is not added in Comparative Example 4, and the viscosity stability of Comparative Example 4 is poor when stored under the high temperature environmental conditions. The poor stability cannot ensure that the product shipped to the client is still satisfied the specification within the shelf life, so that Comparative Example 4 cannot become the commodity.

The hydrophobic filler is not added in Comparative Example 5, and when Comparative Example 5 is performed the bonding test with the structural woodworking, the glue failure rate is far greater than 5% under the environment of boiling water, pressurization and decompression due to the phenomenon of glue layer shrinkage and creep, so that Comparative Example 5 cannot be used for the structural woodwork bonding.

The catalyst is not added in Comparative Example 6, and when Comparative Example 6 is performed the bonding test with the structural woodworking, the operating time and the pressurization time are too long, which caused that the overall process time too long, so that Comparative Example 6 is not satisfied the requirements of the client.

In conclusion, it can be seen that the liquid-state reactive polyurethane adhesives which not add the stabilizer, the hydrophobic filler and the catalyst of the present disclosure and not use the polyisocyanate and the polyol of the present disclosure cannot be used for the structural woodwork bonding. Therefore, according to the liquid-state reactive polyurethane adhesive of Example 1 to Example 4 of the present disclosure, when Example 1 to Example 4 are performed the bonding test with the structural woodworking, the glue failure rates are less than 5% at the different temperature and pressure. It is means that the liquid-state reactive polyurethane adhesives of the present disclosure has the high adhesive strength and the good weather resistant, and it is an one component liquid glue which does not require the glue and has the good operability. Furthermore, comparing with the traditional structural woodworking adhesive, the glue amount of the liquid-state reactive polyurethane adhesive of the present disclosure is 140 $g/m^2$ to 220 $g/m^2$, which is lower than that of the traditional structural woodworking adhesive. The liquid-state reactive polyurethane adhesive of the present disclosure is without formaldehyde, solvent and satisfied with the VOC emission standard and various building safety standard tests, and suitable for the structural woodworking adhesive so as to become a new generation of environmentally friendly building materials.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A liquid-state reactive polyurethane adhesive, comprising:
    a polyurethane prepolymer, wherein the polyurethane prepolymer is blocked by an isocyanate group, and the polyurethane prepolymer is obtained by a polymerization reaction, a reactive monomer of the polymerization reaction comprises:
a polyisocyanate, wherein a functionality of the polyisocyanate is 2.4 to 3;
a polyol, wherein a molecular weight of the polyol is 1000 to 8000, and the polyol has hydrolysis resistance;
a stabilizer, wherein the stabilizer has a structure represented by formula (I):

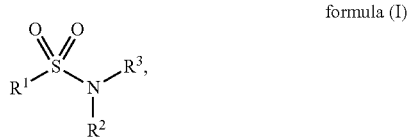

formula (I)

wherein $R^1$, $R^2$ and $R^3$ are each independently a hydrogen or a monovalent organic group;
a catalyst, wherein the catalyst has a structure represented by formula (II):

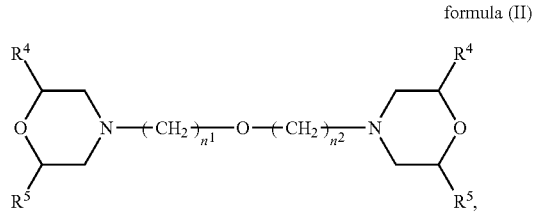

formula (II)

wherein $R^4$ and $R^5$ are each independently a hydrogen or a alkyl group, $n^1$ and $n^2$ are each independently an integer from 2 to 4; and
a hydrophobic filler;
wherein a total weight of the reactive monomer is 100 parts by weight, a content of the stabilizer is 0.01 parts to 3 parts by weight, and a content of the hydrophobic filler is 0.5 parts to 5 parts by weight.

2. The liquid-state reactive polyurethane adhesive of claim 1, wherein the polyisocyanate is selected from an aromatic polyisocyanate, an aliphatic polyisocyanate, an alicyclic polyisocyanate or a mixture thereof.

3. The liquid-state reactive polyurethane adhesive of claim 1, wherein the polyol is selected from a polycarbonate polyol, a polyether polyol or a mixture thereof.

4. The liquid-state reactive polyurethane adhesive of claim 1, wherein the hydrophobic filler is selected from a hydrophobic calcium carbonate, a hydrophobic silica, a hydrophobic talcum powder, a hydrophobic clay or a mixture thereof.

5. The liquid-state reactive polyurethane adhesive of claim 1, wherein the reactive monomer of the polyurethane prepolymer further comprises a polyamine, and a molecular weight of the polyamine is 1000 to 8000.

6. The liquid-state reactive polyurethane adhesive of claim 1, wherein the total weight of the reactive monomer is 100 parts by weight, a content of the polyisocyanate is 40 parts to 70 parts by weight.

7. The liquid-state reactive polyurethane adhesive of claim 1, wherein the total weight of the reactive monomer is 100 parts by weight, a content of the polyol is 30 parts to 60 parts by weight.

8. The liquid-state reactive polyurethane adhesive of claim 5, wherein the total weight of the reactive monomer is 100 parts by weight, a total content of the polyol and the polyamine is 30 parts to 60 parts by weight.

9. The liquid-state reactive polyurethane adhesive of claim 1, wherein the total weight of the reactive monomer is 100 parts by weight, a content of the catalyst is 0.01 parts to 3 parts by weight.

10. The liquid-state reactive polyurethane adhesive of claim 1, wherein the reactive monomer of the polyurethane prepolymer further comprises an additive, and the additive is an antioxidant.

* * * * *